United States Patent
DeVita et al.

(10) Patent No.: US 9,435,261 B2
(45) Date of Patent: Sep. 6, 2016

(54) REDUNDANT COOLING FOR FLUID COOLED SYSTEMS

(71) Applicants: Michael Joseph DeVita, Riverside, CT (US); Timothy Fred Lauder, Oxford, CT (US); Mark Denton Bystry, Stratford, CT (US)

(72) Inventors: Michael Joseph DeVita, Riverside, CT (US); Timothy Fred Lauder, Oxford, CT (US); Mark Denton Bystry, Stratford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 690 days.

(21) Appl. No.: 13/645,795

(22) Filed: Oct. 5, 2012

(65) Prior Publication Data
US 2014/0096525 A1    Apr. 10, 2014

(51) Int. Cl.
| F01P 7/00 | (2006.01) |
| F01P 11/00 | (2006.01) |
| F01P 3/20 | (2006.01) |
| F28F 27/00 | (2006.01) |
| F02C 7/14 | (2006.01) |
| F02C 7/141 | (2006.01) |
| F02C 7/18 | (2006.01) |

(52) U.S. Cl.
CPC ............... *F02C 7/14* (2013.01); *F02C 7/141* (2013.01); *F02C 7/18* (2013.01); *Y02T 50/675* (2013.01)

(58) Field of Classification Search
CPC ............ F02C 7/14; F02C 7/141; F02C 7/18; F02C 7/185
See application file for complete search history.

(56) References Cited

U.S. PATENT DOCUMENTS

| 1,519,812 | A | * | 12/1924 | Schneider | B61C 5/02 105/35 |
| 2,452,007 | A | * | 10/1948 | Weybrew | F01P 7/04 236/35 |
| 3,765,168 | A | | 10/1973 | Wagle | |
| 3,963,372 | A | * | 6/1976 | McLain | B64C 27/14 416/27 |
| 5,253,484 | A | | 10/1993 | Corman et al. | |
| 5,879,466 | A | * | 3/1999 | Creger | B08B 3/02 134/169 A |
| 7,500,542 | B2 | | 3/2009 | Maret et al. | |
| 7,569,954 | B2 | | 8/2009 | Tolle et al. | |
| 2003/0215339 | A1 | * | 11/2003 | Grimmer | F04B 25/00 417/201 |
| 2005/0035657 | A1 | * | 2/2005 | Brummett et al. | 307/10.1 |
| 2006/0011152 | A1 | * | 1/2006 | Hayes | 123/41.49 |
| 2009/0078219 | A1 | * | 3/2009 | Marsh | F01P 1/06 123/41.02 |
| 2010/0181416 | A1 | * | 7/2010 | Sakamoto et al. | 244/17.21 |
| 2013/0047624 | A1 | * | 2/2013 | Suciu et al. | 60/772 |

FOREIGN PATENT DOCUMENTS

| CN | 202417680 U | * | 9/2012 | |
| GB | 665526 A | * | 1/1952 | F01P 3/18 |

* cited by examiner

Primary Examiner — Thomas Denion
Assistant Examiner — Mickey France
(74) Attorney, Agent, or Firm — Cantor Colburn LLP

(57) ABSTRACT

A fluid cooled system includes a first heat generating component. A first airflow pathway directs a first flow of air across a first heat exchanger. A second airflow pathway directs a second flow of air across a second heat exchanger. A first working fluid is flowed from the first heat generating component, through the first heat exchanger and through the second heat exchanger and returned to the first heat generating component.

16 Claims, 7 Drawing Sheets

REDUNDANT COOLING FOR FLUID COOLED SYSTEMS

BACKGROUND OF THE INVENTION

The present disclosure relates to vehicles, for example, rotorcraft with fluid cooled engines. More specifically, the present disclosure relates to redundant cooling systems for vehicles with fluid cooled engines or fluid cooled systems.

Fluid cooled systems, for example, internal combustion engines, require a cooling system that forces air across a heat exchanger to reject thermal energy from a working fluid that circulates through the engine. The cooling system must function during normal engine operation to prevent the engine from overheating that leads to engine failure. Such a cooling system is prone to failure of any one of the multiple components of the system, such as a fan, duct, heat exchanger or fluid distribution system including pumps and piping network Failure or malfunction of any of these components could lead to cooling system failure and, consequently, engine failure.

In some applications, aircraft have multiple engines for redundancy to meet safety and reliability requirements if a failure of one of the engines occurs. It is difficult to meet safety and reliability requirements if a failure of one of the above components of the cooling system can result in cooling system failure. To overcome this difficulty, the individual components, such as the fan, duct and heat exchanger are robustly designed to increase damage and flaw tolerance, with the penalty of additional weight, increased cost, larger component size, and loss of mission capability of the aircraft.

BRIEF DESCRIPTION OF THE INVENTION

A fluid cooled system includes a heat generating component. A first airflow pathway directs a first flow of air across a first heat exchanger. A second airflow pathway directs a second flow of air across a second heat exchanger. A working fluid is flowed from the heat generating component, through the first heat exchanger and through the second heat exchanger and returned to the heat generating component.

A rotorcraft includes an airframe and a rotor assembly operably connected to the airframe including a plurality of rotor blades operably connected to a rotor shaft. The rotorcraft further includes a fluid cooled engine system operably connected to the rotor assembly. The fluid cooled engine system includes an engine, a first airflow pathway to direct a first flow of air across a first heat exchanger, and a second airflow pathway to direct a second flow of air across a second heat exchanger. A working fluid is flowed from the engine, through the first heat exchanger and through the second heat exchanger and returned to the engine.

A method of operating a fluid cooled engine system includes urging a flow of a working fluid from a heat generating component and urging the flow of working fluid through a first heat exchanger. A first airflow is urged across the first heat exchanger via a first airflow pathway thereby transferring thermal energy between the flow of working fluid and the first airflow. The flow of working fluid is conveyed through a second heat exchanger and a second airflow is conveyed across the second heat exchanger via a second airflow pathway thereby transferring thermal energy between the flow of working fluid and the second airflow. The flow of working fluid is returned to the heat generating component.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
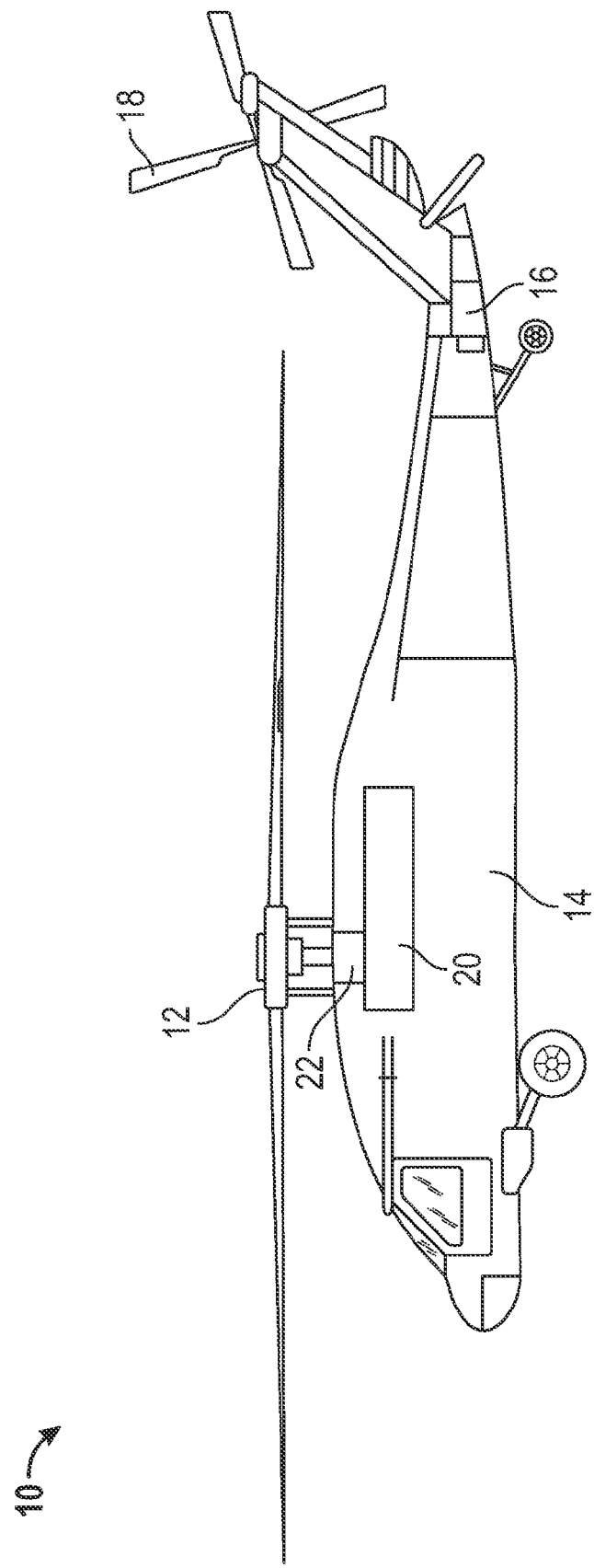
FIG. 1 is a schematic view of an embodiment of a rotary wing aircraft.

FIG. 1 is a schematic illustration of a rotary wing aircraft 10 having a main rotor assembly 12. The aircraft 10 includes an airframe 14 having an extending tail 16 at which is mounted a tail rotor 18. The main rotor assembly 12 is driven by two or more fluid cooled engines 20 connected to the main rotor assembly via a gearbox 22.

Figure 2:
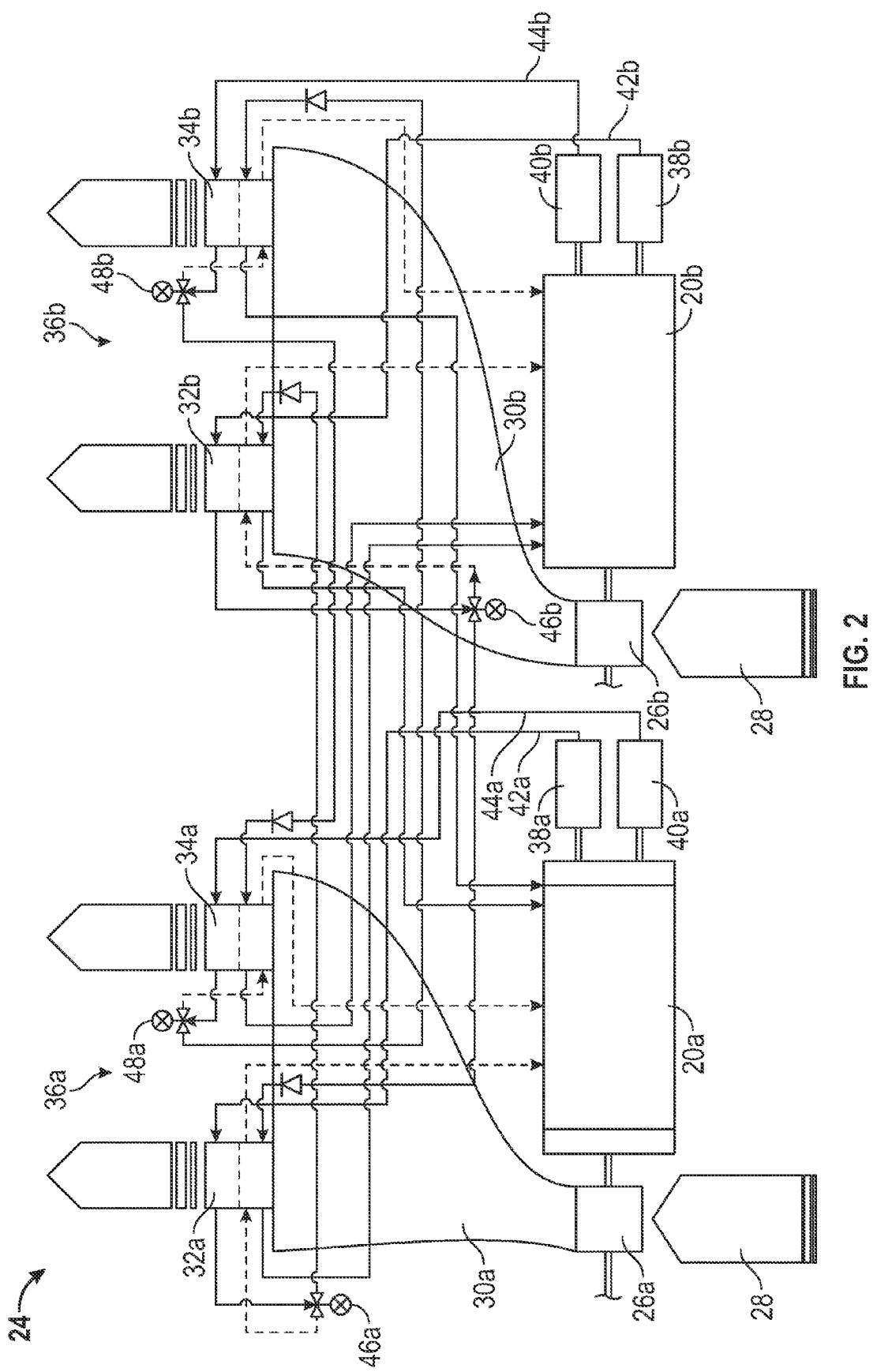
FIG. 2 is a schematic embodiment of an embodiment of a fluid cooled engine system.

Referring now to FIG. 2, in some embodiments the aircraft 10 has two engines 20, identified as 20a and 20b in the FIG. and is cooled via a cooling system 24. It is to be appreciated that while the system 24 described herein is for cooling two engines 20a and 20b, the system 24 may be arranged to cool any number of engines 20. Further, while the system 24 is described herein as applied to a rotary wing aircraft 10, it may be applied to any use of a fluid cooled engine arrangement 20. Also, while the system 24 described herein is utilized to cool engines, it is to be appreciated that the system 24 may be utilized to cool other heat generating components or machines.

A first engine 20a is operably connected to a first fan 26a which urges a flow of inlet air 28 into a first duct 30a. A first coolant heat exchanger 32a and first engine oil heat exchanger 34a are arranged at the first duct 30a upstream of a first duct outlet 36a. Further, first engine 20a is operably connected to a first coolant pump 38a and a first oil pump 40a.

Similarly, a second engine 20b is operably connected to a second fan 26b which urges a flow of inlet air 28 into a second duct 30b. A second coolant heat exchanger 32b and second engine oil heat exchanger 34b are arranged at the second duct 30b upstream of a second duct outlet 36b. Further, second engine 20b is operably connected to a second coolant pump 38b and a second oil pump 40b.

Figure 3:
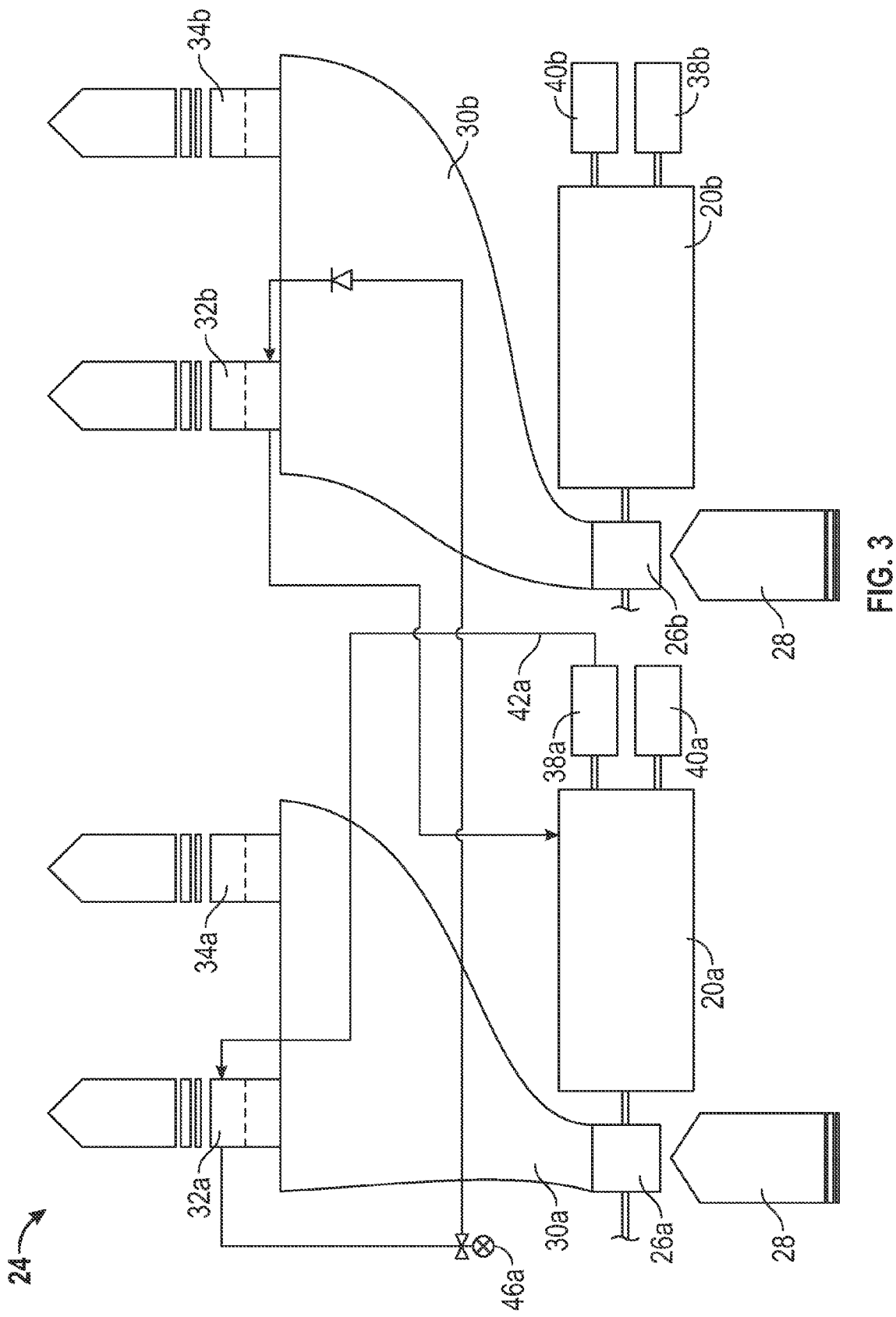
FIG. 3 is a schematic of coolant flow in a fluid cooled engine system.

Flow of coolant and engine oil for engines 20a and 20b during normal operation of engines 20a and 20b and cooling system 24 is illustrated in FIGS. 3-6. Referring to FIG. 3, when the first engine 20a is operating, the first fan 26a, the first coolant pump 38a and the first oil pump 40a, driven by the first engine 20a are also operating. The first fan 26a urges inlet air 28 through the first duct 30a and across the first coolant heat exchanger 32a and the first engine oil heat exchanger 34a. The first coolant pump 38a pumps a first engine coolant flow 42a from the first engine 20a. The first coolant pump 38a urges this first engine coolant flow 42a through the first coolant heat exchanger 32a, where thermal energy is transferred from the first engine coolant flow 42a to the inlet air 28 flowing through the first duct 30a. The first engine coolant flow 42a is then urged to the second coolant heat exchanger 32b and flowed therethrough to transfer thermal energy from the first engine coolant flow 42a to inlet air 28 flowing through the second duct 30b. After flowing through the second coolant heat exchanger 32b, the first engine coolant flow 42a is flowed into the first engine 20a where thermal energy is transferred from the first engine 20a to the first engine coolant flow 42a to cool the first engine 20a. Directing the first engine coolant flow 42a through both the first coolant heat exchanger 32a and the second coolant heat exchanger 32b allows for effective cooling of the first engine 20a even with failure of components such as the first coolant heat exchanger 32a, the first fan 26a or first duct 30a.

Figure 4:
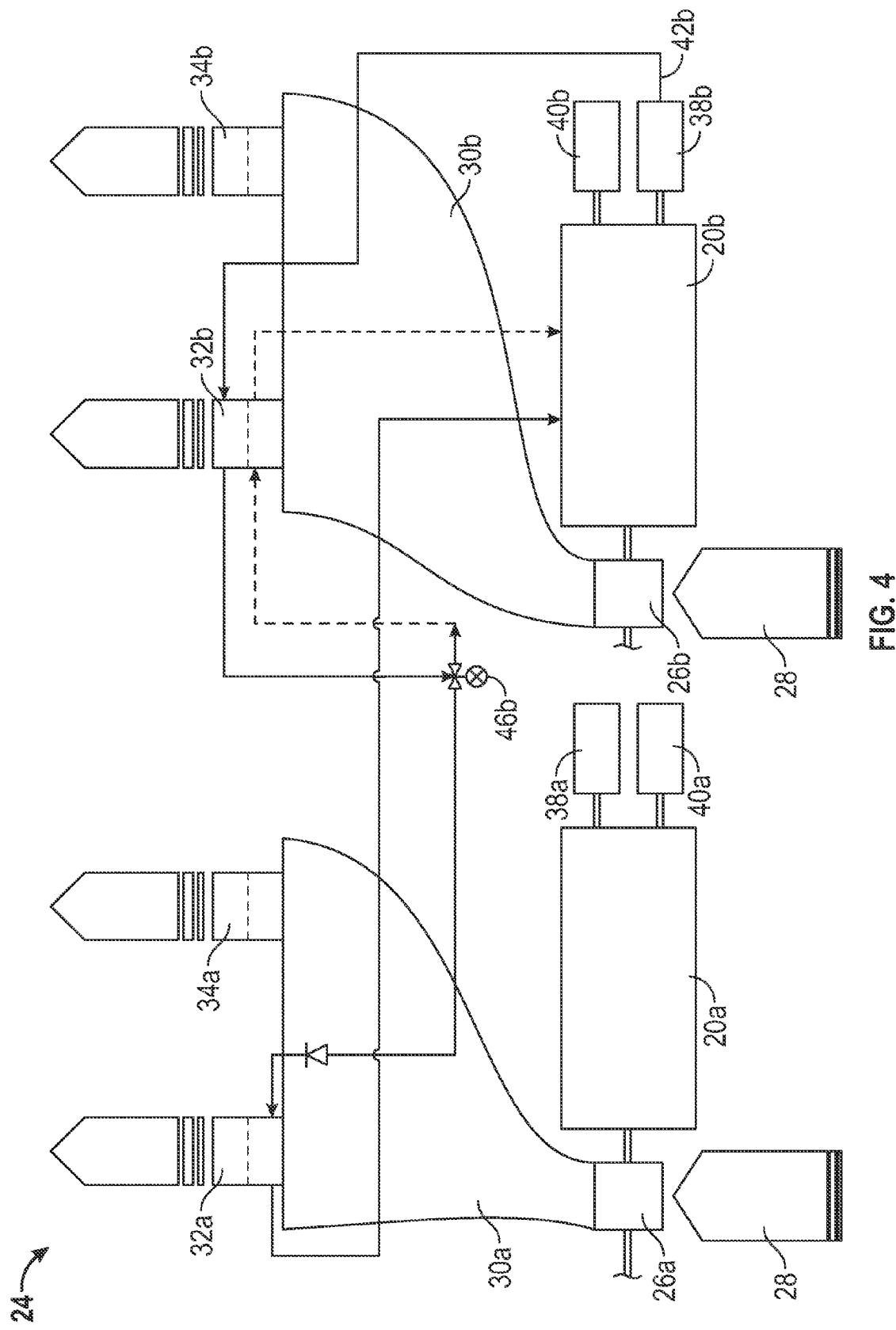
FIG. 4 is another schematic of coolant flow in a fluid cooled engine system.

Similarly, and referring now to FIG. 4, a second engine coolant flow 42b is pumped from the second engine 20b by the second coolant pump 38b. The second coolant pump 38b urges the second engine coolant flow 42b through the second coolant heat exchanger 32b, where thermal energy is transferred from the second engine coolant flow 42b to the inlet air 28 flowing through the second duct 30b. The second engine coolant flow 42b is then urged to the first coolant heat exchanger 32a and flowed therethrough to transfer thermal energy from the second engine coolant flow 42b to inlet air 28 flowing through the first duct 30a. After flowing through the first coolant heat exchanger 32a, the second engine coolant flow 42b is flowed into the second engine 20b where thermal energy is transferred from the second engine 20b to the second engine coolant flow 42b to cool the second engine 20b. Directing the second engine coolant flow 42b through both the second coolant heat exchanger 32b and the first engine coolant heat exchanger 32a allows for effective cooling of the second engine 20b even with failure of components such as the second coolant heat exchanger 32b, the second fan 26b or second duct 30b.

Figure 5:
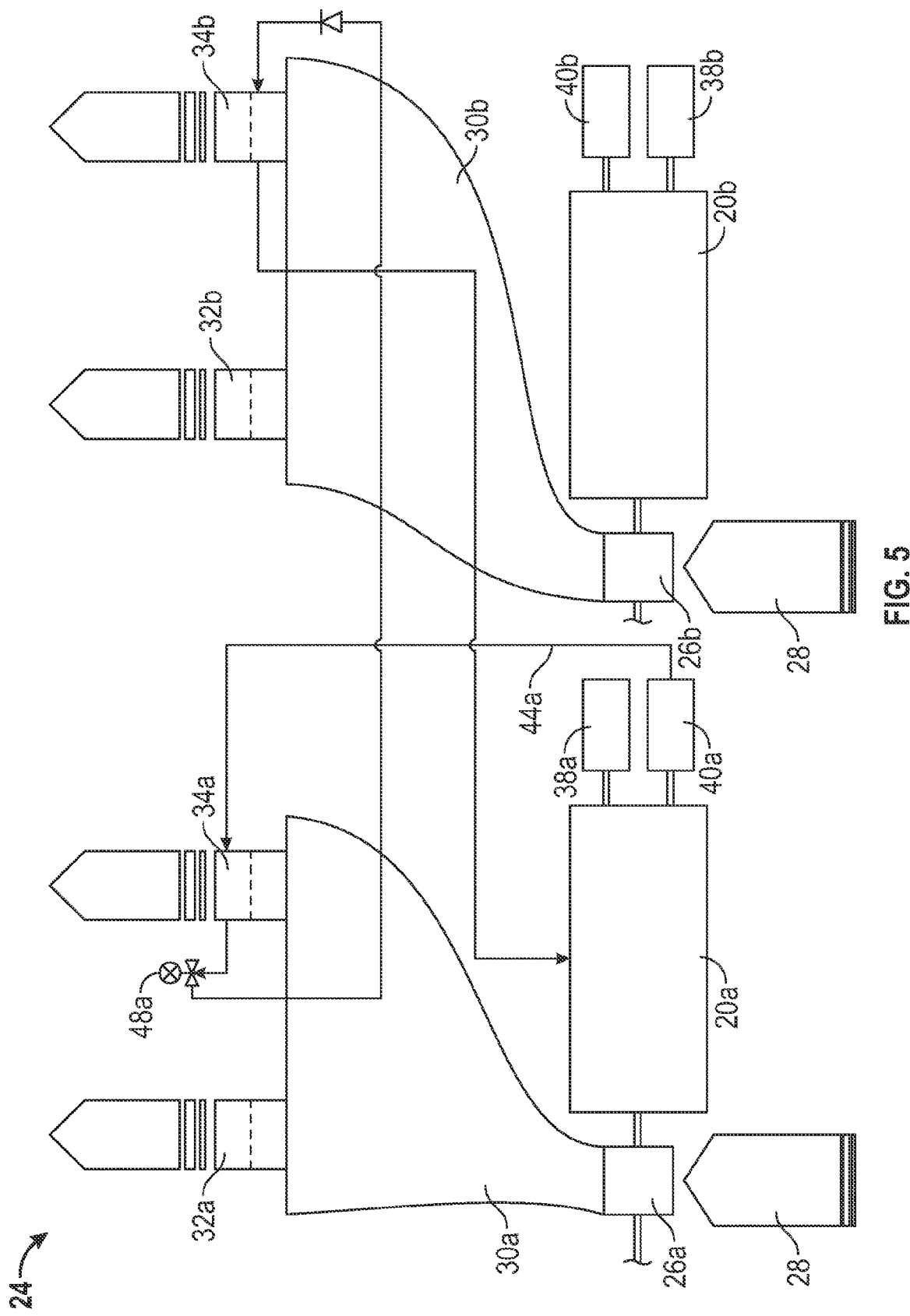
FIG. 5 is a schematic of lubricant flow in a fluid cooled engine system.

Referring to FIG. 5, the first oil pump 40a pumps a first engine oil flow 44a from the first engine 20a and through the first engine oil heat exchanger 34a, where thermal energy is transferred between the first engine oil flow 44a and the inlet flow 28 through the first duct 30a. The first engine oil flow 44a then proceeds through the second engine oil heat exchanger 34b and thermal energy is transferred between the first engine oil flow 44a and the inlet flow 28 through the second duct 30b. The first engine oil flow 44a is then flowed into the first engine 20a to lubricate and transfer thermal energy from the first engine 20a to the first engine oil flow 44a to cool the first engine 20a. Directing the first engine oil flow 44a through both the first engine oil heat exchanger 34a and the second engine oil heat exchanger 34b allows for effective cooling of the first engine oil flow 44a even with failure of components such as the first engine oil heat exchanger 34a, the first fan 26a or the first duct 30a.

Figure 6:
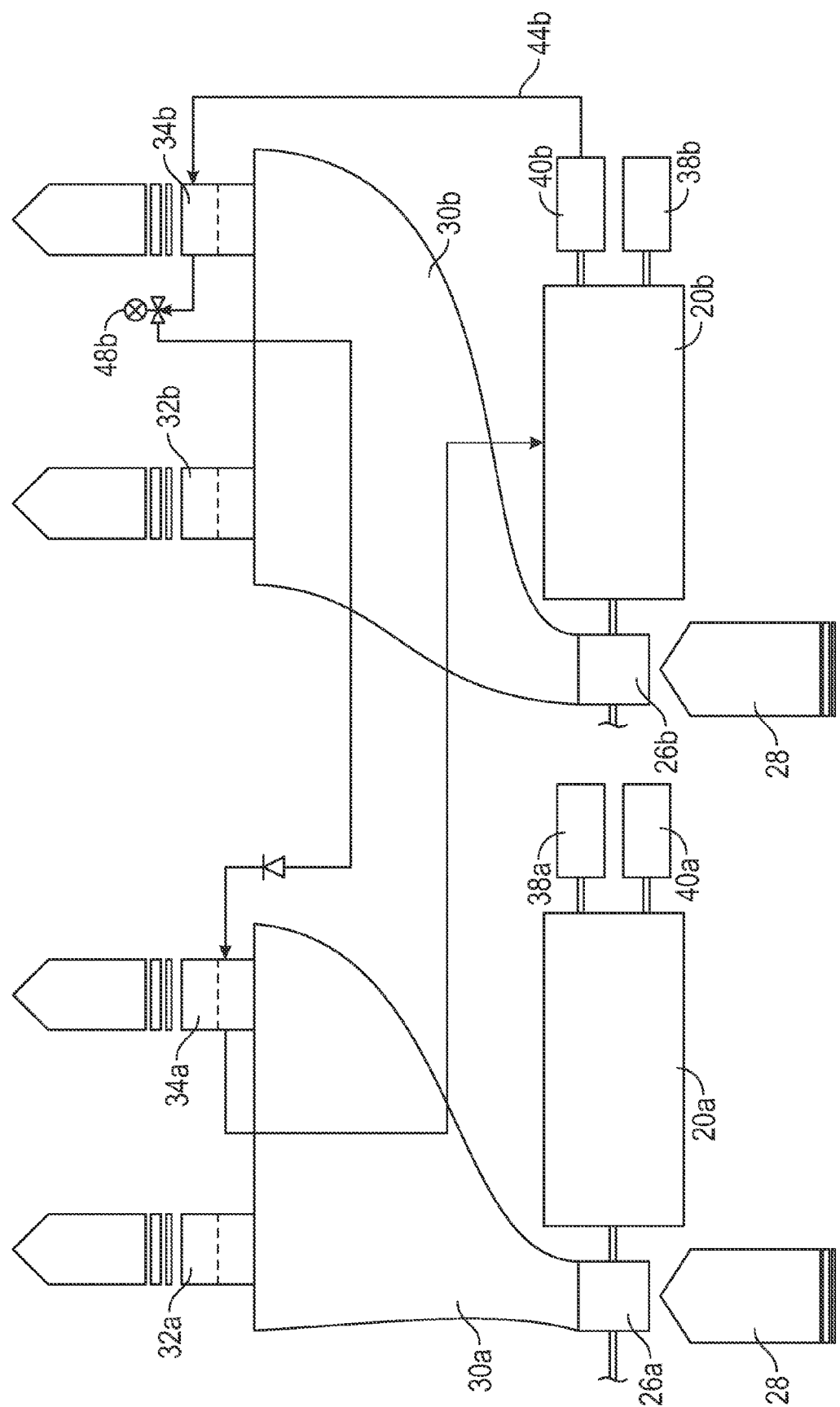
FIG. 6 is another schematic of lubricant flow in a fluid cooled engine system.

Referring to FIG. 6, the second oil pump 40b pumps a second engine oil flow 44b from the second engine 20b and through the second engine oil heat exchanger 34b, where thermal energy is transferred between the second engine oil flow 44b and the inlet flow 28 through the second duct 30b. The second engine oil flow 44b then proceeds through the first engine oil heat exchanger 34a and thermal energy is transferred between the second engine oil flow 44b and the inlet flow 28 through the first duct 30a. The second engine oil flow 44b is then flowed into the second engine 20b to lubricate and transfer thermal energy from the second engine 20b to the second engine oil flow 44b to cool the second engine 20b. Directing the second engine oil flow 44b through both the second engine oil heat exchanger 34b and the first engine oil heat exchanger 34a allows for effective cooling of the second engine oil flow 44b even with failure of components such as the second engine oil heat exchanger 34b, the second fan 26b or the second duct 30b.

Figure 7:
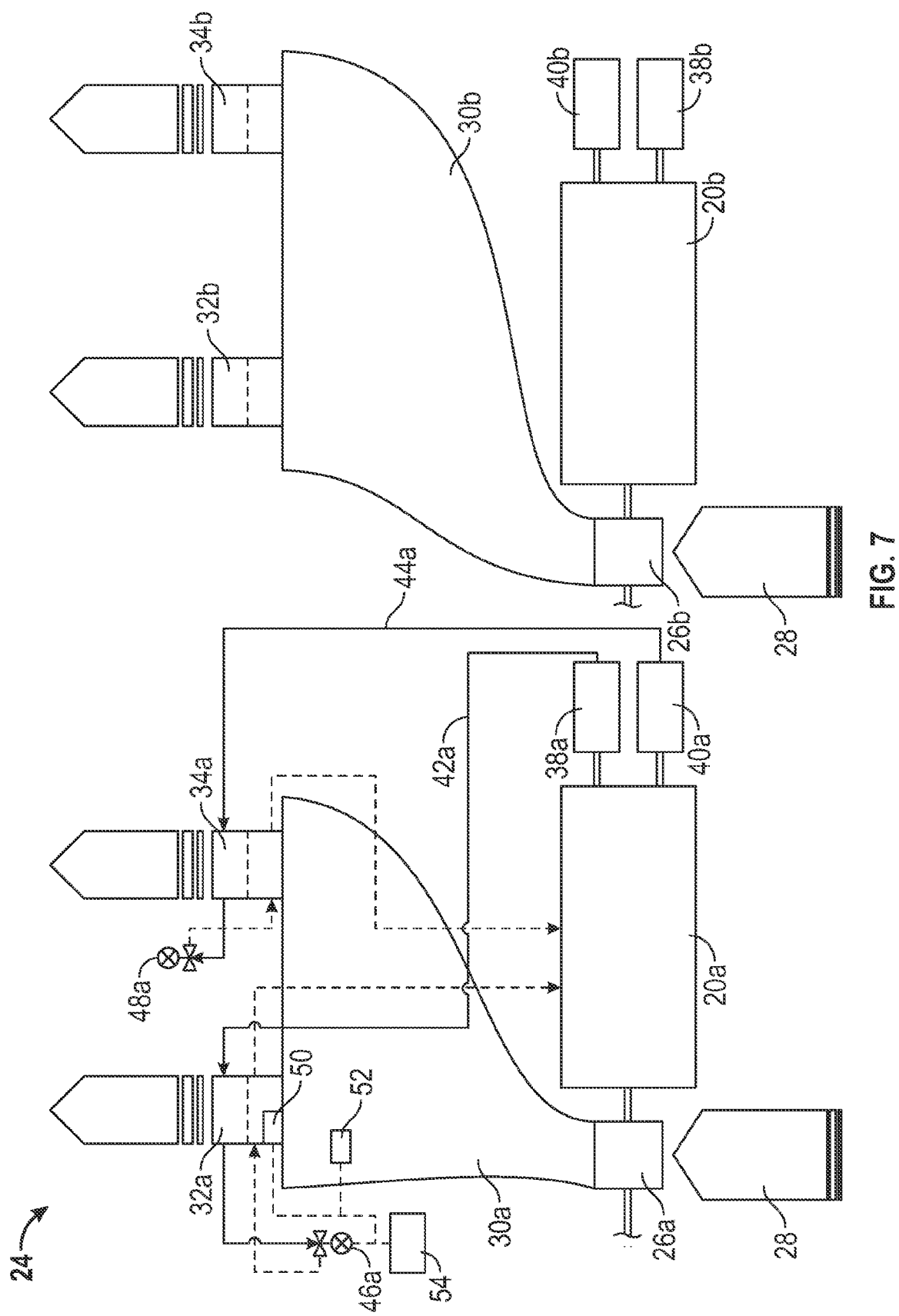
FIG. 7 is a schematic of fluid flow in a fluid cooled engine system.

Referring now to FIG. 7, the system 24 is still operable to serve a remaining engine in the case of failure of one engine. For example, as shown in FIG. 7, in the case of a failure of the second engine 20b, the system 24 would still serve the first engine 20a with sufficient cooling capacity for continued normal operation. In the case of failure of the second engine 20b, first engine coolant flow 42a is not routed to second coolant heat exchanger 32b, but is diverted back through first coolant heat exchanger 32a for a second pass by operation of first coolant valve 46a. Similarly, the first engine oil flow 44a is not routed to second oil heat exchanger 34b, but is diverted for a second pass through first oil heat exchanger 34a by first oil valve 48a. Second coolant valve 46b and second oil valve 48b (shown in FIG. 2) are provided to similarly divert the second engine coolant flow 42b and the second engine oil flow 44b in the case of a failure of the first engine 20a. In some embodiments, sensors such as temperature sensors 50 and/or pressure sensors 52 are provided in the system 24 to assist in determining functionality of the system 24. In some embodiments, the sensors are connected to a health monitor 54 or other controller that utilizes inputs from the sensors to determine if valves 46a, 46b, 48a or 48b should be used to divert the flows 42a, 42b, 44a, 44b from their respective normal paths.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:
1. A fluid cooled system comprising:
a first heat generating component;
a first heat exchanger disposed at a first airflow pathway, the first airflow pathway comprising a first duct having a first duct outlet and configured to direct a first flow of air across the first heat exchanger;
a second heat exchanger disposed at a second airflow pathway, the second airflow pathway comprising a second duct having a second duct outlet and configured to direct a second flow of air across the second heat exchanger, a first working fluid flowed sequentially from the first heat generating component, through the first heat exchanger and through the second heat exchanger and returned to the first heat generating component;
a second heat generating component;
a third heat exchanger disposed at the first airflow pathway, the first airflow pathway configured to direct the first flow of air across the third heat exchanger, wherein the first heat exchanger and the third heat exchanger are each disposed upstream of the first duct outlet; and
a fourth heat exchanger disposed at the second airflow pathway, the second airflow pathway configured to direct the second flow of air across the fourth heat exchanger, a second working fluid flowed sequentially from the second heat generating component, through the third heat exchanger and through the fourth heat exchanger and returned to the second heat generating component, wherein the second heat exchanger and the fourth heat exchanger are each disposed upstream of the second duct outlet.

2. The system of claim 1, wherein the first working fluid and the second working fluid are one of coolant or lubricant.

3. The system of claim 1, further comprising a first pump to urge the first working fluid through the first heat exchanger.

4. The system of claim 1, further comprising a fan to urge the first flow of air through the first airflow pathway.

5. The system of claim 4, wherein the fan is driven by the first heat generating component.

6. A rotorcraft comprising:
an airfame;
a rotor assembly operably connected to the airframe; and
a fluid cooled engine system operably connected to the rotor assembly comprising:
a first engine;
a first heat exchanger disposed at a first airflow pathway, the first airflow pathway comprising a first duct having a first duct outlet and configured to direct a first flow of air across the first heat exchanger;
a second heat exchanger disposed at a second airflow pathway, the second airflow pathway comprising a second duct having a second duct outlet and configured to direct a second flow of air across the second heat exchanger,
a first working fluid flowed sequentially from the first engine, through the first heat exchanger and through the second heat exchanger and returned to the first engine;
a second engine;
a third heat exchanger disposed at the first airflow pathway, the first airflow pathway configured to direct the first flow of air across the third heat exchanger, wherein the first heat exchanger and the third heat exchanger are each disposed upstream of the first duct outlet; and
a fourth heat exchanger disposed at the second airflow pathway, the second airflow pathway configured to direct the second flow of air across the fourth heat exchanger, a second working fluid flowed sequentially from the second engine, through the third heat exchanger and through the fourth heat exchanger and returned to the second engine, wherein the second heat exchanger and the fourth heat exchanger are each upstream of the second duct outlet.

7. The rotorcraft of claim 6, wherein the first working fluid and the second working fluid are one of coolant or lubricant.

8. The rotorcraft of claim 6, further comprising a first pump to urge the first working fluid through the first heat exchanger.

9. The rotorcraft of claim 6, further comprising a fan to urge the first flow of air through the first airflow pathway.

10. The rotorcraft of claim 9, wherein the fan is driven by the first engine.

11. A method of operating a fluid cooled engine system comprising:
urging a first working fluid from a first engine;
urging the first working fluid through a first heat exchanger;
urging a first airflow across the first heat exchanger via a first airflow pathway thereby transferring thermal energy between the first working fluid and the first airflow, the first airflow pathway comprising a first duct having a first duct outlet;
conveying the first working fluid from the first heat exchanger across a second heat exchanger;
urging a second airflow across the second heat exchanger via a second airflow pathway thereby transferring thermal energy between the first working fluid and the second airflow, the second airflow pathway comprising a second duct having a second duct outlet;
returning the first working fluid to the first engine;
urging a second working fluid from a second engine;
urging the second working fluid through a third heat exchanger, the first heat exchanger and the third heat exchanger disposed upstream of the first duct outlet of the first airflow pathway;
urging the first airflow across the third heat exchanger via the first airflow pathway thereby transferring thermal energy between the second working fluid and the first airflow;
conveying the second working fluid from the third heat exchanger across a fourth heat exchanger, the second heat exchanger and the fourth heat exchanger disposed upstream of the second duct outlet of the second airflow pathway;
urging the second airflow across the fourth heat exchanger via the second airflow pathway thereby transferring thermal energy between the second working fluid and the second airflow; and
returning the second working fluid to the second engine.

12. The method of claim 11, wherein the first working fluid and the second working fluid are one of coolant or lubricant.

13. The method of claim 11, further comprising:
sensing a failure in the second heat exchanger of the second airflow pathway;
diverting the first working fluid through the first heat exchanger a second time to transfer additional thermal energy from the first working fluid; and
returning the first working fluid to the first engine.

14. The method of claim 11, further comprising:
sensing a loss of sufficient airflow through the second airflow pathway to the second heat exchanger;
diverting the first working fluid through the first heat exchanger a second time to transfer additional thermal energy from the first working fluid; and
returning the first working fluid to the first engine.

15. The method of claim 11, further comprising urging the first airflow through the first airflow pathway via a fan.

16. The method of claim 15, further comprising driving the fan with the first engine.

* * * * *